(12) United States Patent
Panwar et al.

(10) Patent No.: US 7,835,357 B2
(45) Date of Patent: Nov. 16, 2010

(54) METHODS AND APPARATUS FOR PACKET CLASSIFICATION BASED ON POLICY VECTORS

(75) Inventors: Ramesh Panwar, Pleasanton, CA (US); Deepak Goel, Sunnyvale, CA (US); Srinivasan Jagannadhan, Sunnyvale, CA (US); Jean-Marc Frailong, Los Altos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 38 days.

(21) Appl. No.: 12/242,172

(22) Filed: Sep. 30, 2008

(65) Prior Publication Data

US 2010/0080224 A1  Apr. 1, 2010

(51) Int. Cl.
*H04L 12/28* (2006.01)
(52) U.S. Cl. .................. 370/389; 370/392; 370/388; 340/2.22; 340/2.21
(58) Field of Classification Search ............ 340/2.22, 340/2.21

See application file for complete search history.

(56) References Cited

U.S. PATENT DOCUMENTS

| | | | |
|---|---|---|---|
| 4,215,402 A | 7/1980 | Mitchell et al. | |
| 5,473,607 A | 12/1995 | Hausman et al. | |
| 5,495,476 A * | 2/1996 | Kumar | 370/388 |
| 6,073,160 A | 6/2000 | Grantham et al. | |
| 6,157,955 A | 12/2000 | Narad et al. | |
| 6,212,184 B1 | 4/2001 | Venkatachary et al. | |
| 6,226,629 B1 | 5/2001 | Cossock | |
| 6,266,705 B1 | 7/2001 | Ullum et al. | |
| 6,457,058 B1 | 9/2002 | Ullum et al. | |
| 6,587,466 B1 | 7/2003 | Bhattacharya et al. | |
| 6,600,741 B1 * | 7/2003 | Chrin et al. | 370/375 |
| 6,600,744 B1 | 7/2003 | Carr et al. | |
| 6,618,397 B1 | 9/2003 | Huang | |
| 6,654,373 B1 | 11/2003 | Maher, III et al. | |
| 6,658,482 B1 | 12/2003 | Chen et al. | |
| 6,665,274 B1 | 12/2003 | Yamada | |
| 6,675,163 B1 | 1/2004 | Bass et al. | |
| 6,721,316 B1 | 4/2004 | Epps et al. | |
| 6,731,631 B1 * | 5/2004 | Chang et al. | 370/388 |
| 6,731,644 B1 | 5/2004 | Epps et al. | |
| 6,735,670 B1 | 5/2004 | Bronstein et al. | |
| 6,754,662 B1 | 6/2004 | Li | |
| 6,778,532 B1 | 8/2004 | Akahane et al. | |
| 6,778,546 B1 | 8/2004 | Epps et al. | |

(Continued)

OTHER PUBLICATIONS

Office Action mailed Feb. 17, 2010 for U.S. Appl. No. 12/242,168 (12 pages).

(Continued)

*Primary Examiner*—Duc C Ho
(74) *Attorney, Agent, or Firm*—Cooley LLP (57) ABSTRACT

In one embodiment, a method, comprising producing a first policy vector based on a first portion of a data packet received at a multi-stage switch. The method also includes producing a second policy vector based on a second portion of the data packet different than the first portion of the data packet. A third policy vector is produced based on a combination of at least the first policy vector and at least the second policy vector. The third policy vector including a combination of bit values configured to trigger an element at the multi-stage switch to process the data packet.

16 Claims, 5 Drawing Sheets

U.S. PATENT DOCUMENTS

| | | |
|---|---|---|
| 6,778,984 B1 | 8/2004 | Lu et al. |
| 6,789,118 B1 | 9/2004 | Rao |
| 6,813,243 B1 | 11/2004 | Epps et al. |
| 6,859,455 B1 | 2/2005 | Yazdani et al. |
| 6,862,278 B1 | 3/2005 | Chang et al. |
| 6,889,225 B2 | 5/2005 | Cheng et al. |
| 6,917,946 B2 | 7/2005 | Corl, Jr. et al. |
| 6,925,085 B1 | 8/2005 | Krishna et al. |
| 6,940,862 B2 | 9/2005 | Goudreau |
| 6,947,931 B1 | 9/2005 | Bass et al. |
| 6,977,930 B1 | 12/2005 | Epps et al. |
| 7,042,878 B2 | 5/2006 | Li |
| 7,089,240 B2 | 8/2006 | Basso et al. |
| 7,133,400 B1 | 11/2006 | Henderson et al. |
| 7,136,926 B1 | 11/2006 | Iyer et al. |
| 7,173,931 B2 | 2/2007 | Chao et al. |
| 7,190,696 B1 | 3/2007 | Manur et al. |
| 7,193,997 B2 | 3/2007 | Van Lunteren et al. |
| 7,227,842 B1 | 6/2007 | Ji et al. |
| 7,233,568 B2 | 6/2007 | Goodman et al. |
| 7,233,579 B1 | 6/2007 | Crump et al. |
| 7,277,429 B2 | 10/2007 | Norman et al. |
| 7,325,074 B2 | 1/2008 | McRae |
| 7,349,415 B2 | 3/2008 | Rangarajan et al. |
| 7,356,033 B2 | 4/2008 | Basu et al. |
| 7,369,561 B2 | 5/2008 | Wybenga et al. |
| 7,373,345 B2 | 5/2008 | Carpentier et al. |
| 7,382,637 B1 | 6/2008 | Rathnavelu et al. |
| 7,382,777 B2 | 6/2008 | Irish et al. |
| 7,382,876 B2 | 6/2008 | Lauter et al. |
| 7,383,244 B2 | 6/2008 | Bass et al. |
| 7,394,809 B2 * | 7/2008 | Kumar et al. ............ 370/392 |
| 7,403,524 B2 | 7/2008 | Hill |
| 7,403,526 B1 | 7/2008 | Zou et al. |
| 7,418,505 B2 | 8/2008 | Lim et al. |
| 7,441,268 B2 | 10/2008 | Remedios |
| 7,480,302 B2 | 1/2009 | Choi |
| 7,543,052 B1 | 6/2009 | Cesa Klein |
| 7,602,787 B2 | 10/2009 | Cheriton |
| 7,610,330 B1 * | 10/2009 | Quinn et al. ............ 709/201 |
| 7,646,771 B2 | 1/2010 | Guru et al. |
| 7,668,160 B2 | 2/2010 | Narayan et al. |
| 2002/0138648 A1 | 9/2002 | Liu |
| 2002/0152209 A1 | 10/2002 | Merugu et al. |
| 2002/0191605 A1 | 12/2002 | Lunteren et al. |
| 2003/0023846 A1 | 1/2003 | Krishna et al. |
| 2003/0030575 A1 | 2/2003 | Frachtenberg et al. |
| 2003/0053460 A1 | 3/2003 | Suda et al. |
| 2003/0059045 A1 | 3/2003 | Ruehle |
| 2003/0156586 A1 | 8/2003 | Lee et al. |
| 2003/0219017 A1 | 11/2003 | Davis et al. |
| 2003/0223424 A1 | 12/2003 | Anderson et al. |
| 2003/0233516 A1 | 12/2003 | Davis et al. |
| 2004/0015599 A1 | 1/2004 | Trinh et al. |
| 2004/0028046 A1 | 2/2004 | Govindarajan et al. |
| 2004/0100950 A1 | 5/2004 | Basu et al. |
| 2004/0100959 A1 | 5/2004 | Relan |
| 2004/0190526 A1 | 9/2004 | Kumar et al. |
| 2004/0254909 A1 | 12/2004 | Testa |
| 2004/0258067 A1 | 12/2004 | Irish et al. |
| 2004/0264373 A1 | 12/2004 | Engbersen et al. |
| 2005/0083935 A1 | 4/2005 | Kounavis et al. |
| 2005/0141510 A1 | 6/2005 | Narsinh et al. |
| 2005/0226235 A1 | 10/2005 | Kumar et al. |
| 2005/0232261 A1 | 10/2005 | Wybenga et al. |
| 2005/0237938 A1 | 10/2005 | Corl, Jr. et al. |
| 2006/0050690 A1 | 3/2006 | Epps et al. |
| 2006/0083247 A1 | 4/2006 | Mehta |
| 2006/0195896 A1 | 8/2006 | Fulp et al. |
| 2006/0218167 A1 | 9/2006 | Bosley et al. |
| 2006/0221954 A1 | 10/2006 | Narayan et al. |
| 2006/0221956 A1 | 10/2006 | Narayan et al. |
| 2006/0221967 A1 | 10/2006 | Narayan et al. |
| 2007/0008962 A1 | 1/2007 | Basu et al. |
| 2007/0070900 A1 | 3/2007 | Heink et al. |
| 2007/0071233 A1 | 3/2007 | Zak |
| 2007/0115986 A1 | 5/2007 | Shankara |
| 2007/0133593 A1 | 6/2007 | Shankara |
| 2007/0234005 A1 | 10/2007 | Erlingsson et al. |
| 2007/0283045 A1 | 12/2007 | Nguyen et al. |
| 2008/0177812 A1 | 7/2008 | Brandle |
| 2008/0186974 A1 | 8/2008 | Singh et al. |
| 2008/0228798 A1 | 9/2008 | Van Lunteren |
| 2009/0196297 A1 | 8/2009 | Jabr |
| 2010/0040067 A1 | 2/2010 | Hao et al. |

OTHER PUBLICATIONS

H. Jonathan Chao et al. "Matching Algorithms for Three-Stage Bufferless Clos Network Switches" IEEE Communications Magazine, Oct. 2003, pp. 46-54.

Itamar Elhanany et al. "High-performance Packet Switching Architectures" Springer Science & Business Media, ISBN-10: 184628273X, 2002, Chapter 10, 20 pages.

Office Action mailed May 10, 2010 for U.S. Appl. No. 12/242,143 (23 pages).

Office Action mailed Apr. 23, 2010 for U.S. Appl. No. 12/347,495 (11 pages).

Office Action mailed Jun. 10, 2010 for U.S. Appl. No. 12/242,278, filed Sep. 30, 2008 (24 pages).

* cited by examiner

METHODS AND APPARATUS FOR PACKET CLASSIFICATION BASED ON POLICY VECTORS

RELATED APPLICATION

This application is related to a co-pending U.S. patent application Ser. No. 12/242,168, entitled "Methods and Apparatus Related to Packet Classification Associated with a Multi-Stage Switch," filed on Sep. 30, 2008, which is incorporated herein by reference in its entirety.

BACKGROUND

Embodiments described herein relate generally to packet classification, and, in particular, to packet classification at a multi-stage switch.

A data packet received at a network device can be processed based on one or more policies established by, for example, a network administrator. Any processing performed so that the data packet can be subsequently processed at the network device based on a policy can be referred to as packet classification. Packet classification can include, for example, associating the data packet with an appropriate policy from a library of policies based on information included in the data packet such as an address value and/or a port value. A packet classification scheme can be used to, for example, distinguish and route groups of data packets within a firewall or through a switch fabric associated with a multi-stage switch.

Known packet classification schemes, such as those based on Ternary Content Addressed Memories (TCAMs) or software algorithms, can have power requirements, chip area requirements, and/or storage requirements that may be undesirable in some applications. For example, known software packet classification algorithms that rely on relatively large data structures resident in external memory (external to a processing chip) may have memory bandwidth limitations that can make their use in very high speed switches and routers impractical. Power consumption requirements and/or inefficient chip designs associated with some known packet classification schemes may substantially prevent scaling of these packet classification schemes, for example, for use in a complex routing system such as a data center.

Thus, a need exists for methods and apparatus for packet classification that have desirable power, chip area, and/or storage characteristics.

SUMMARY OF THE INVENTION

In one embodiment, a method, comprising producing a first policy vector based on a first portion of a data packet received at a multi-stage switch. The method also includes producing a second policy vector based on a second portion of the data packet different than the first portion of the data packet. A third policy vector is produced based on a combination of at least the first policy vector and at least the second policy vector. The third policy vector including a combination of bit values configured to trigger an element at the multi-stage switch to process the data packet.

DETAILED DESCRIPTION

A packet classification module at a multi-stage switch can be configured to classify a data packet (e.g., an Internet Protocol (IP) packet, a session control protocol packet, a media packet) received at the multi-stage switch from a network entity. Classifying can include any processing performed so that the data packet can be processed at the multi-stage switch based on a policy. In some embodiments, the policy can include one or more policy conditions that are associated with an instruction that can be executed at the multi-stage switch. The policy can be, for example, a policy to route a data packet to a particular destination (instruction) if the data packet has a specified type of network address (policy condition). Packet classification can include determining whether or not the policy condition has been satisfied so that the instruction can be executed. For example, one or more portions (e.g., a field, a payload, an address portion, a port portion) of the data packet can be analyzed by the packet classification module based on a policy condition defined within a policy. When the policy condition is satisfied, the data packet can be processed based on an instruction associated with the policy condition.

In some embodiments, a data packet can be associated with a policy vector that can include one or more bit values that represent whether or not a policy condition associated with a policy has been satisfied based on processing of a portion of the data packet. The policy vector can be used to trigger processing of the data packet at the multi-stage switch based on an instruction associated with the policy (when the bit value(s) indicate that the policy condition has been satisfied). In some embodiments, a policy vector can be referred to as a facet cover vector.

In some embodiments, a policy condition can be related to a prefix length of an address value and/or a range of port values. The policy condition can be satisfied, for example, when a port value included in a data packet falls within a specified range of port values. In some embodiments, this type of policy condition can be referred to as a match condition or as a filter condition. In some embodiments, an instruction associated with a policy condition can be related to, for example, routing of a data packet through a switch fabric of a multi-stage switch.

The packet classification module (including any sub-modules and/or memory) can be implemented in hardware. For example, sub-modules of the packet classification module that are configured to process the data packet based on one or more policy conditions associated with a policy can be implemented in hardware. In addition, modules that are configured to execute an instruction associated with a policy can be implemented in hardware and can be included in a packet classification. In some embodiments, the packet classification module (including sub-modules and memory) can be integrated on a single (or common) semiconductor chip. In some embodiments, one or more portions of the packet classification module can be implemented in software, or implemented in a combination of hardware and software.

In some embodiments, the process of classifying a data packet can be referred to as classification. In some embodiments, a portion of a multi-stage switch can be configured to trigger another portion of the multi-stage switch to execute an instruction associated with a policy. In some embodiments, a multi-stage switch can be configured to trigger, based on a policy vector, execution of an instruction at a separate entity. In some embodiments, a data packet can be processed based on a policy that is associated with a group of data packets. In some embodiments, the group of data packets can be referred to as a data packet flow or as a flow.

In some embodiments, a vector, such as the policy vector, can be a binary string defined by, for example, a sequence of high values (represented as 1's) and/or low values (represented as 0's). The values in the binary string can be referred to as bit values. In other words, the vector can define a sequence of bit values. In some embodiments, for example, if a packet classification module is implemented in a hardware system that is a base-n system (e.g., a base-4 system), a vector processed by the packet classification module can be a base-n string. In some embodiments, the vector can be defined as a one-dimensional array. In some embodiments, for example, if a packet classification module is implemented in software, a vector processed by the packet classification module can be a string that includes a sequence of symbols (e.g., American Standard Code for Information Interchange (ASCII) characters) and/or digits. For example, the vector can be a byte string or a hexadecimal value.

Figure 1:
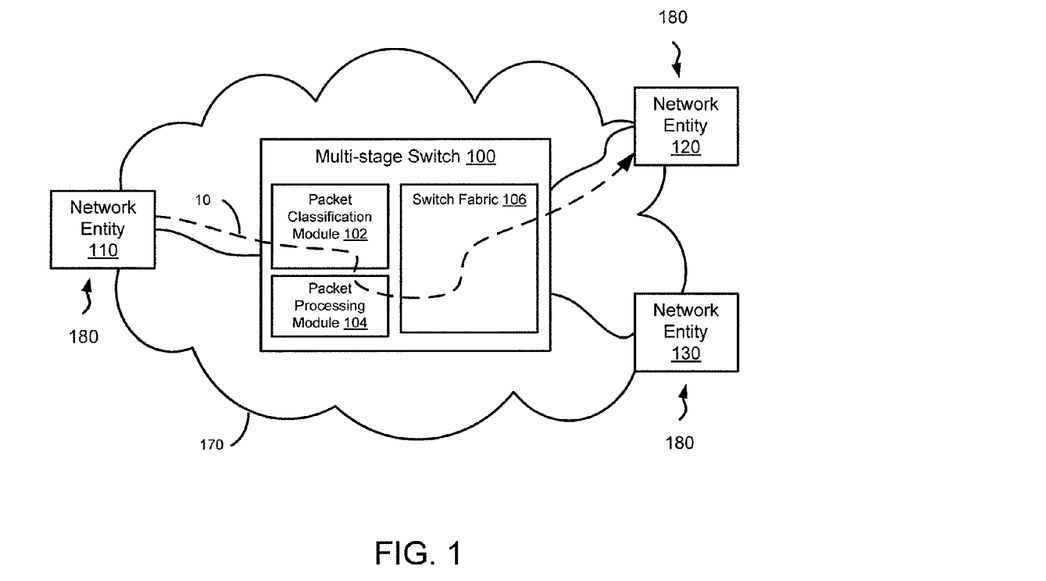
FIG. 1 is a schematic block diagram that illustrates a packet classification module included in a multi-stage switch, according to an embodiment.

FIG. 1 is a schematic block diagram that illustrates a packet classification module 102 included in a multi-stage switch 100, according to an embodiment. The multi-stage switch 100 includes a switch fabric 106 that can have multiple stages (e.g., an ingress stage, an egress stage, a middle stage) through which a data packet can be routed. In some embodiments, the switch fabric 106 can be defined based on a Clos network architecture (e.g., a non-blocking Clos network, a strict sense non-blocking Clos network, a Benes network). In some embodiments, a network architecture such as, for example, a Clos network and/or a Benes network can be reconfigurable (e.g., rearrangeable). In some embodiments, the switch fabric 106 can be a reconfigurable switch fabric and/or a time-division multiplexed switch fabric.

The packet classification module 102 can be configured to receive a data packet from at least one of the network entities 180, which include network entity 110, network entity 120, and network entity 130, and is configured to classify the data packet so that the data packet can be processed based on a policy. The policy can include one or more policy conditions associated with an instruction that can be executed at the multi-stage switch 100. One or more portions of the data packet can be analyzed by the packet classification module 102 based on a policy condition (e.g., a match condition) associated with a policy. The data packet can be processed by a packet processing module 104 based on an instruction associated with the policy condition when the policy condition is satisfied. In some embodiments, the packet processing module 102 can execute one or more portions of the instruction associated with the policy and/or can trigger another entity (not shown) to execute one or more portions of the instruction associated with the policy. In some embodiments, processing of a data packet based on the instruction can include, for example, logging information related to the data packet, verifying information at the multi-stage switch 100, forwarding the data packet to a specific destination such as one of the network entities 180, dropping the data packet (or a related data packet), routing a portion of a data packet flow associated with the data packet through switch fabric 106 of the multi-stage switch 100, and so forth.

In some embodiments, the packet classification module 102 can be configured to define (e.g., produce) a policy vector based on one or more portions of a data packet. The policy vector can include one or more bit values that represent whether or not a policy condition associated with a policy has been satisfied based on the portion(s) of the data packet. The policy vector can be used by the packet processing module 104 to process the data packet and/or to trigger processing of the data packet at the multi-stage switch 100, based on an instruction associated with the policy (when the bit value(s) indicate that the policy condition has been satisfied). In some embodiments, the policy vector can be a decompressed policy vector that has been defined based on a compressed policy vector. More details related to compression and decompression of policy vectors are discussed in connection with FIG. 2.

As shown in FIG. 1, a data packet 10 is sent from network entity 110 and received at the multi-stage switch 100. Data packet 10 is classified at the packet classification module 102. Specifically, packet classification module 102 associates data packet 10 with a policy vector based on information from the data packet 10. As shown in FIG. 1, the data packet 10 is routed through the switch fabric 106 to network entity 120 based on processing of the data packet 10 at packet processing module 104. The processing of the data packet 10 at the packet processing module 104 can be triggered based on the policy vector associated at the packet classification module 102 with the data packet 10.

In some embodiments, each of the network entities 180 (e.g., network entity 110) can be a wired device and/or a wireless device and can be, for example, a computing entity (e.g., a personal computing device), a mobile phone, a personal digital assistant (PDA), and/or a server (e.g., a web server/host). In some embodiments, each of the network entities 180 can function as a source device and/or as a destination device. Each of the network entities 180 can be configured to operate based on one or more platforms that can include one or more types of hardware, software, operating systems, runtime libraries, and so forth. The network 170 can be, for example, a virtual network, a local area network (LAN) and/or a wide area network (WAN) and can include one or more wired and/or wireless segments.

The packet classification module 102 and/or the packet processing module 104 can be a hardware-based module (e.g., a processor, an application-specific integrated circuit (ASIC), a field programmable gate array (FPGA)). In other words, the packet classification module 102 and/or the packet processing module 104 can be implemented entirely in hardware. In some embodiments, the entire packet classification module 102 (including look-up tables associated with the packet classification module 102) and/or the packet processing module 104 can be integrated on one or more semiconductor chips that can have one or more substrates. In some embodiments, one or more portions of the packet classification module 102 and/or the packet processing module 104 can be implemented in software (e.g., a set of instructions executable at a processor, a software application). In some embodiments, one or more portions (e.g., operations, functions) of the packet classification module 102 and/or the packet processing module 104 can implemented in a combination of hardware and software.

Figure 2:
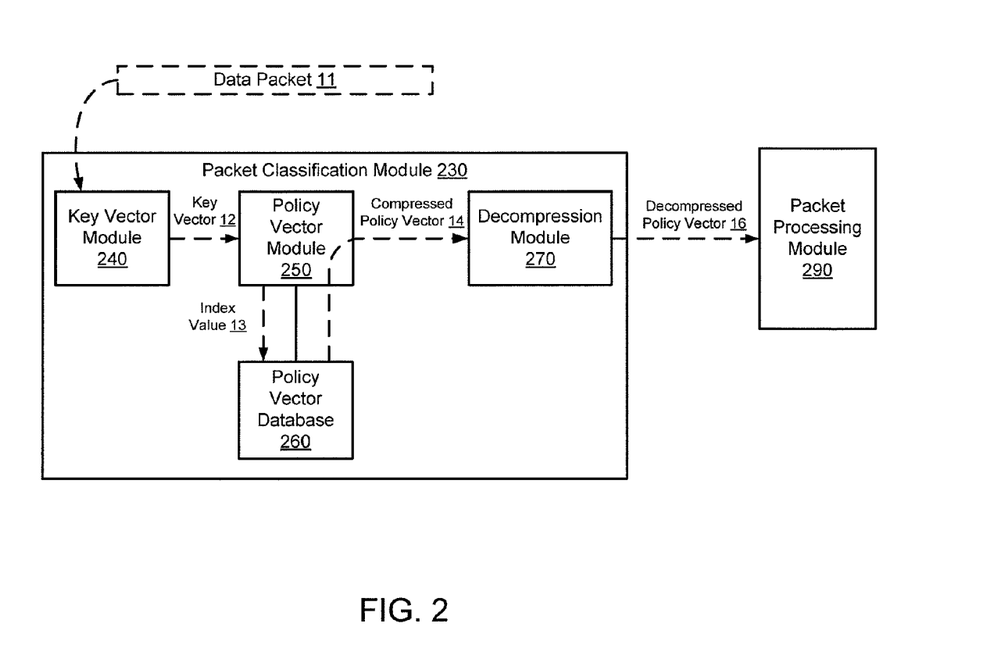
FIG. 2 is a schematic block diagram of a packet classification module, according to an embodiment.

FIG. 2 is a schematic block diagram of a packet classification module 230, according to an embodiment. The packet classification module 230 can be included in a multi-stage switch (not shown in FIG. 1). The packet classification module 230 includes a key vector module 240 configured to produce a key vector 12 based on a data packet 11. In some embodiments, the data packet 11 can be received from a network entity (not shown in FIG. 1) via a network (not shown in FIG. 1). The key vector 12 can be used by the policy vector module 250 to retrieve a compressed policy vector 14 from a policy vector database 260 when at least one policy condition is satisfied. Specifically, the policy vector module 250 produces an index value 13 based on the key vector 12; the compressed policy vector 14 can then be retrieved from the policy vector database 260 by policy vector module 250 using an index value 13. Although not shown, the policy vector database 260 can be stored in a memory that has addressable locations.

After the compress policy vector 14 has been retrieved, the compressed policy vector 14 can be decompressed by a decompression module 270 into a decompressed policy vector 16. In other words, the compressed policy vector 14 can be processed by decompression module 270 based on a decompression algorithm to define a decompressed policy vector 16. The decompressed policy vector 16 can be used by the packet processing module 290 to trigger and/or perform processing associated with the data packet 11 based on an instruction retrieved from, for example, an instruction database. The policy condition used to retrieve the compressed policy vector 14 and the instruction can be associated with (e.g., defined within) a policy. In some embodiments, the instruction database can be included in the packet processing module 290.

The key vector module 240 can be configured to parse (e.g., extract) bit values associated with certain portions of the data packet 11 to define the key vector 12. In other words, the key vector module 240 can be configured to parse a portion from the data packet 11 received at the packet classification module 230 and can use that portion to produce the key vector 12. In some embodiments, the key vector 12 can be defined based on portions of the data packet 11 that have been modified by the key vector module 240 or are unmodified.

In some embodiments, the key vector module 240 can be configured to define and include additional bit values (or strings) in the key vector 12. In some embodiments, the additional bit values can be default bit values and/or padding (e.g., zero padding). In some embodiments, for example, the key vector 12 can be defined based on additional bit values appended to, intermingled with, and/or logically combined with a portion of the data packet 11. In some embodiments, the key vector 12 can have a specified quantity of bit values, such as, for example, a 1 bit width, a 72 bit width, or a 400 bit width. An example of a key vector defined based on a data packet is described in connection with FIG. 3.

Figure 3:
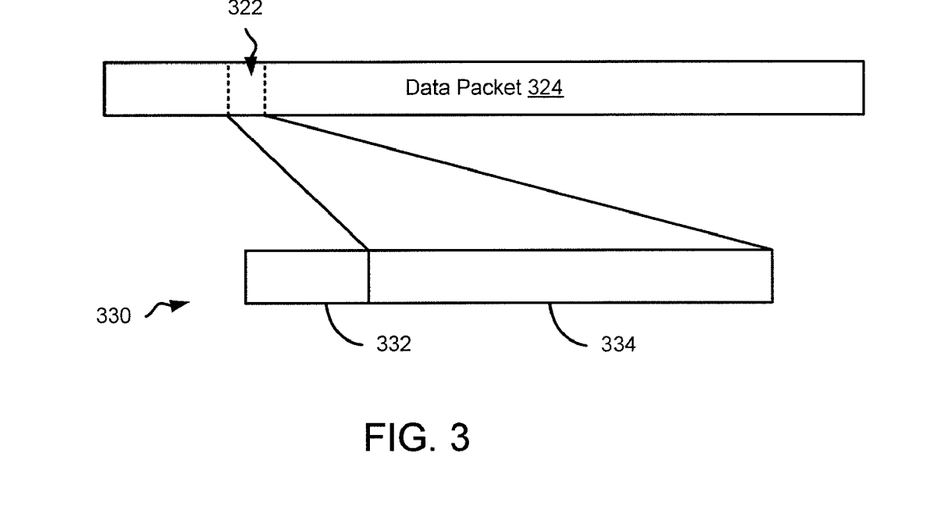
FIG. 3 is a schematic diagram that illustrates a key vector defined based on a portion of a data packet, according to an embodiment.

FIG. 3 is a schematic diagram that illustrates a key vector 330 defined based on a portion 322 of a data packet 324, according to an embodiment. The portion 322 can be, for example, a field (or a portion of a field) from a header, a payload, and/or a trailer of the data packet 324. In some embodiments, the portion 322 can be referred to as a facet. In some embodiments, the portion 322 can be associated with any of an address value (e.g., a destination address value, a source address value), a port value (e.g., a source port value, a destination port value), a protocol indicator, a type value, and so forth. In some embodiments, the bit values of the portion 322 of the data packet 324 can be modified before being included in the key vector 330. In some embodiments, the key vector 330 can be a key vector. An example of a binary representation of a key vector 330 is shown below:

00 000100 11001000 00000000 00000000 00000000 00000000 00000000

As shown in FIG. 3, the key vector 330 includes a bit string 332 defined based on the data packet 324. In some embodiments, the bit string 332 can be a metadata tag that represents a characteristic of the key vector 330 (e.g., a length of the key vector 330) and/or a characteristic of the data packet 324 (e.g., a protocol type).

Referring back to FIG. 2, the policy vector module 250 can be configured to retrieve a compressed policy vector 14 from the policy vector database 260 based on the key vector 12 and based on at least one policy condition associated with a policy. The policy vector module 250 can be configured to execute one or more functions that can use the key vector 12 to retrieve the compressed policy vector 14. The function(s) can have one or more portions defined based on the policy condition(s) so that the compressed policy vector 14 is retrieved based on whether or not the policy condition(s) is satisfied. In other words, the policy condition(s) can be integrated into (e.g., encoded within) and applied by the function (and the policy vector module 250) so that the compressed policy vector 14 can be defined based on whether or not the policy condition(s) is satisfied. In some embodiments, a policy condition can be satisfied when a portion of the data packet 11, which can be encoded in the key vector 12, is matched to a range of values defined within the policy condition.

As shown in FIG. 2, the policy vector module 250 is configured to process the key vector 12 to define an index value 13 based on the key vector 12 and based on a policy condition. The index value 13 can be used by the policy vector module 250 to retrieve the compressed policy vector 14 from the policy vector database 260. In some embodiments, the index value 13 can be an address value associated with a memory location. In some embodiments, the evaluation of the policy condition(s) can be integrated into the functionality of the policy vector module 250 so that the index value 13 can be defined based on whether or not the policy condition is satisfied.

In some embodiments, the policy vector module 250 can be configured to process the key vector 12 based on, for example, a hash-based search function (also can be referred to as a hash function), a tri-based search function, a look-up table search function (e.g., a direct look-up table search function), and/or a node-based search function (also can be referred to linked-node function). More details related to hash functions and hash function processing within a packet classification module are set forth in co-pending U.S. patent application Ser. No. 12/242,154, filed on Sep. 30, 2008, entitled "Methods and Apparatus Related to Packet Classification Based on Range Values," and co-pending U.S. patent application Ser. No. 12/242,158, filed on Sep. 30, 2008, entitled "Methods and Apparatus for Producing a Hash Value Based on a Hash Function," both of which are incorporated herein by reference in their entireties. More details related to node-based functions are provided in co-pending U.S. patent application Ser. No. 12/242,125, filed on Sep. 30, 2008, entitled "Methods and Apparatus for Range Matching During Packet Classification Based on a Linked-Node Structure," which is incorporated herein by reference in its entirety.

Figure 4:
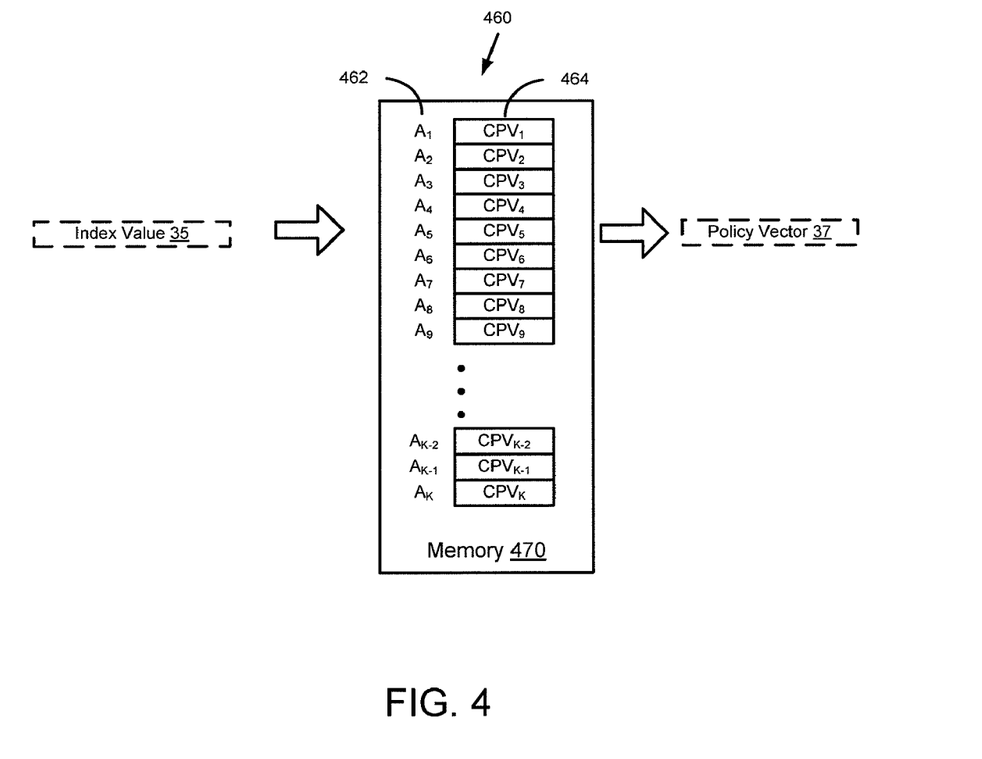
FIG. 4 is a schematic diagram that illustrates compressed policy vectors included in a policy vector database, according to an embodiment.

FIG. 4 is a schematic diagram that illustrates compressed policy vectors 464 included in a policy vector database 460, according to an embodiment. The policy vector database 460 is an example of an implementation of the policy vector database 260 shown in FIG. 2. The policy vector database 460 includes policy vectors $CPV_1$ through $CPV_K$. Each of the policy vectors 464 is stored at a location within a memory 470 represented by one of the address values $A_1$ through $A_K$. In some embodiments, the address values 462 can be referred to as memory address values. The index value 35 can be used to locate at least one of the compressed policy vectors 464 stored in the policy vector database 460 at a particular address value 462. In some embodiments, the index value 35 can correspond with one of the address values 462. In some embodiments, the policy vector database 460 can include a logic module (not shown) that can use bit values that define the index value 35 to retrieve a compressed policy vector from the policy vector database 460.

In some embodiments, the memory 470 can be any type of memory such as a read-only memory (ROM) or a random-access memory (RAM). In some embodiments, the policy vector database 460 can be a look-up table (LUT) or a memory array. In some embodiments, the policy vector database 460 can be a relational database. Because the policy vectors stored in the policy vector database 460 are compressed policy vectors 464, the memory 470 can be relatively small and can be integrated with a policy vector module (not shown) on a single (or common) semiconductor chip. In some embodiments, the compressed policy vectors 464 can be compressed based on a pattern compression scheme and/or a run-length compression scheme.

Referring back to FIG. 2, the decompression module 270 can be configured to define a decompressed policy vector 16 based on the compressed policy vector 14. Specifically, the compressed policy vector 14 can be processed by the decompression module 270 to produce the decompressed policy vector 16 based on a decompression algorithm associated with a compression/decompression scheme. This type of processing can be referred to as decompression. In some embodiments, the compression/decompression scheme can be referred to as a codec. After the compressed policy vector 14 has been decompressed by the decompression module 270, the decompressed policy vector 16 can be used by the packet processing module 290 to trigger and/or perform processing associated with the data packet 11.

The compressed policy vector 14 can be processed based on a codec to define the decompressed policy vector 16. The codec can also be used to define the compressed policy vector 14 based on the decompressed policy vector 16. For example, if the compressed policy vector 14 was defined (e.g., compressed) based on a pattern and run-length codec, the decompressed policy vector 16 can be defined (e.g., decompressed) from the compressed policy vector 14 based on the same pattern and run-length codec.

In some embodiments, the compressed policy vector 14 can have a number of bit values that is at least an order of magnitude smaller than a number of bit values included in the decompressed policy vector 16. For example, the compressed policy vector 14 can have a bitwise width of 32 bits and the decompressed policy vector 16 can have a bitwise width of 2048 bits (2K bits). More details related to compression and decompression of policy vectors are set for in co-pending U.S. patent application Ser. No. 12/242,143, filed Sep. 30, 2008, entitled, "Methods and Apparatus for Compression in Packet Classification," which is incorporated herein by reference in its entirety.

In some embodiments, the packet processing module 290 can be integrated into the packet classification module 230. For example, although not shown, a packet processing module can be included within the same semiconductor chip as a packet classification module implemented in hardware. In some embodiments the packet processing module 290 can be an element included in a multi-stage switch (not shown) and can be associated with a switch fabric (not shown) of the multi-stage switch.

Figure 5:
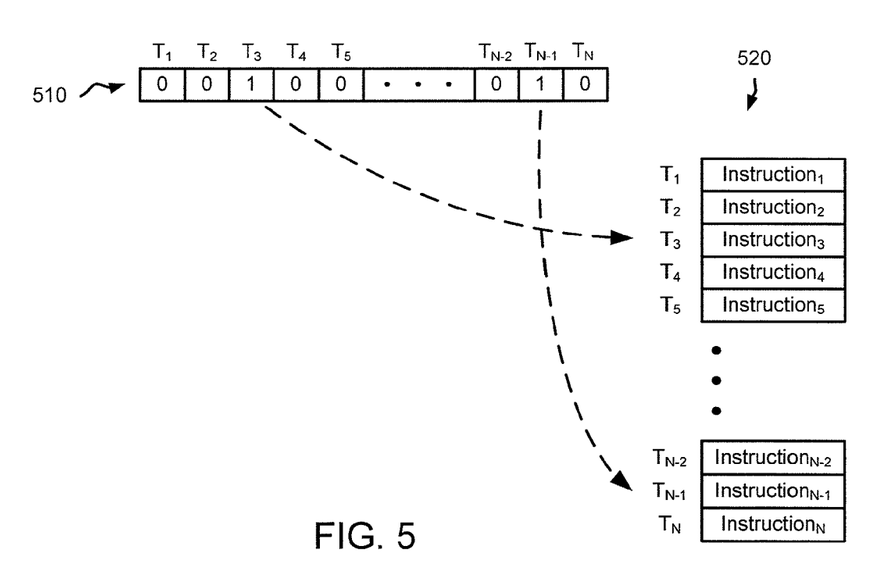
FIG. 5 is a schematic diagram that illustrates a decompressed policy vector configured to trigger processing at a multi-stage switch, according to an embodiment.

FIG. 5 is a schematic diagram that illustrates a decompressed policy vector 510 configured to trigger processing at a multi-stage switch, according to an embodiment. The decompressed policy vector 510 can be configured to trigger processing at, for example, a packet processing module (not shown) within the multi-stage switch. The decompressed policy vector 510 includes bit values $T_1$ through $T_N$, each of which can be configured to trigger processing at the multi-stage switch. Specifically, each set of bit values (e.g., bit values that have a high binary value) in the decompressed policy vector 510 represent whether or not a policy condition associated with a policy has been satisfied. The set of bit values can be used to look-up an instruction from instructions 1 through N in database 520 (also can be referred to as an instruction database). After an instruction has been identified, the instruction can be executed at the multi-stage switch. In some embodiments, the decompressed policy vector 510 can be configured to trigger processing associated with data packet 11 and/or can be configured to trigger processing of a data packet flow associated with data packet 11. In some embodiments, a bit value can be set when the bit value is low or zero.

As shown in the decompress policy vector 510 in FIG. 5, bit value $T_3$, which is set, is associated with $instruction_3$, and bit value $T_{N-1}$, which is also set, is associated with $instruction_{N-1}$. Accordingly, bit value $T_3$ can be used to trigger execution of $instruction_3$ and bit value $T_{N-1}$ can be used to trigger execution of $instruction_{N-1}$. The instruction can be related to processing of a data packet at a packet processing module at a multi-stage switch (not shown) such as, for example, routing of the data packet via a switch fabric (not shown) of the multi-stage switch.

In some embodiments, a combination of bit values (e.g., binary values of 1's and/or 0's) within the policy vector can represent whether or not a policy condition associated with one or more instructions has been satisfied. In other words, a sequence of bit values including more than one bit value can represent that a policy condition associated with an instruction has been satisfied. Accordingly, the sequence of bit values within the policy vector can trigger execution of an instruction. In some embodiments, a single bit value within the policy vector can represent that a policy condition associated with more than one instruction has been satisfied. In some embodiments, the single bit value within the policy vector can be used to trigger execution of the instructions.

Figure 6:
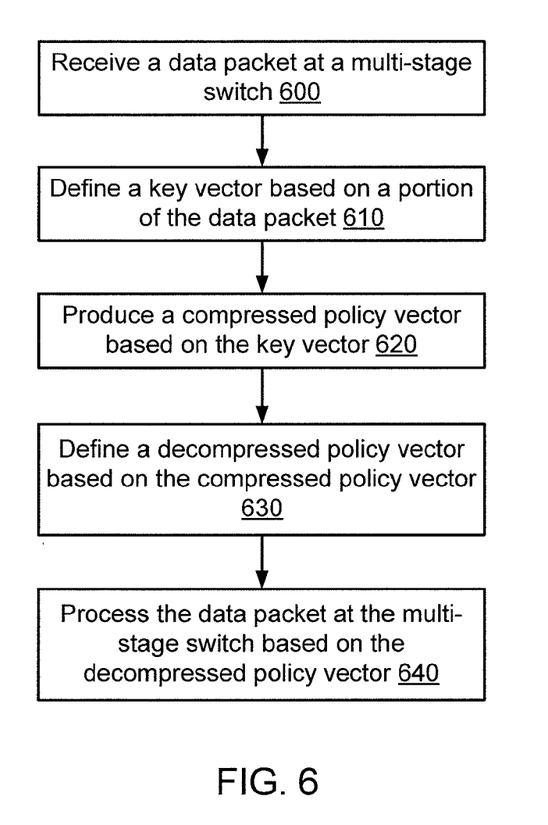
FIG. 6 is a flowchart that illustrates a method for classification of a data packet, according to an embodiment.

FIG. 6 is a flowchart that illustrates a method for classification of a data packet, according to an embodiment. A data packet is received at a multi-stage switch at 600. The data packet can be received from a source network entity. In some embodiments, the data packet can be associated with a flow of data packets received at the multi-stage switch.

A key vector is defined based on a portion of the data packet at 610. In some embodiments, the key vector can be defined based on a field from the data packet. In some embodiments, the key vector can be defined based on another data packet from a flow of data packets associated with the data packet. In some embodiments, the key vector can be defined based on a combination of portions of data packets from a flow of data packets associated with the data packet.

A compressed policy vector is produced based on the key vector at 620. In some embodiments, the compressed policy vector can be selected from a policy database based on processing of the key vector. In some embodiments, the key vector can be processed based on a hash-based search function, a tri-based search function, a look-up table search function, and/or a node-based search function. The hash-based search function, a tri-based search function, a look-up table search function, and/or the node-based search function can be implemented, for example, in hardware within a packet classification module.

A decompressed policy vector is defined based on the compressed policy vector at 630. The compressed policy vector can be used to define the decompressed policy vector based on a decompression algorithm associated with a codec. In some embodiments, the decompression algorithm can be implemented in hardware within a packet classification module.

The data packet is processed at the multi-stage switch based on the decompressed policy vector at 640. Specifically, one or more of the bit values within the decompressed policy vector can be configured to trigger an element of the multi-stage switch to process the data packet. For example, a bit value within the decompressed policy vector can be configured to trigger the multi-stage stage to forward the data packet (and/or a flow of data packet associated with the data packet) to a destination entity via a switch fabric associated with the multi-stage switch. In some embodiments, a bit value within the decompressed policy vector can be configured to, for example, trigger the multi-stage switch to drop the packet or log information related to the data packet.

Figure 7:
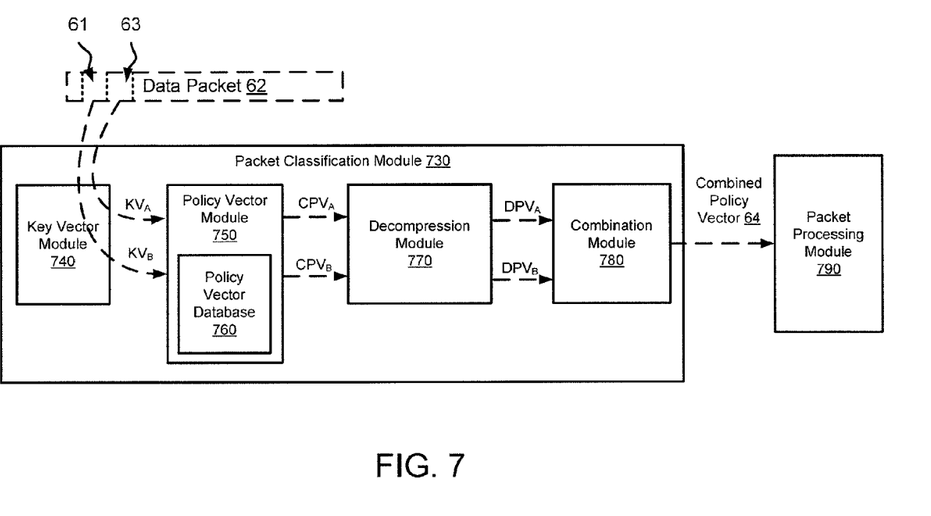
FIG. 7 is a schematic block diagram that illustrates a packet classification module configured to define a combined policy vector based on multiple portions of a data packet, according to an embodiment.

FIG. 7 is a schematic block diagram that illustrates a packet classification module 730 configured to define a combined policy vector 64 based on multiple portions of a data packet 62, according to an alternative embodiment. In some embodiments, the combined policy vector 64 can be referred to as a master policy vector. The packet classification module 730 can be included in a multi-stage switch (not shown). In some embodiments, the data packet 62 can be received at the multi-stage switch from a network entity (not shown in FIG. 7) via a network (not shown in FIG. 7).

As shown in FIG. 7, the data packet 62 has two portions—portion 61 and portion 63—that are processed within a processing pipeline that includes a key vector module 740, a policy vector module 750, and a decompression module 770. In some embodiments, the processing pipeline can be referred to as a processing path.

The key vector module 740 is configured to define a key vector $KV_A$ based on portion 61 of the data packet 62. The key vector $KV_A$ can be used by the policy vector module 750 to retrieve a compressed policy vector $CPV_A$ from the policy vector database 760. In some embodiments, the policy vector module 750 can process the key vector $KV_A$ to define an index value; the policy vector module 750 can then retrieve the compressed policy vector $CPV_A$ from the policy vector database 760 based on the index value. Although not shown, the policy vector database 760 can be stored in a memory. A decompressed policy vector $DPV_A$ can be defined at the decompression module 770 based on the compressed policy vector $CPV_A$.

Portion 63 of the data packet 62 can similarly be processed through the processing pipeline. The key vector module 740 can be configured to produce a key vector $KV_B$ based on the portion 63 of the data packet 62. The key vector $KV_B$ can be used by the policy vector module 750 to retrieve the compressed policy vector $CPV_B$ from the policy vector database 760, and a decompressed policy vector $DPV_B$ can be defined at the decompression module 770 based on the compressed policy vector $CPV_B$.

In this embodiment, the key vectors $KV_A$ and $KV_B$ are different. In some embodiments, portion 61 of the data packet 62 and portion 63 of the data packet 62 can be mutually exclusive portions of the data packet 62. Although not shown, in some embodiments, the different key vectors $KV_A$ and $KV_B$ can be defined based on the same portion (or overlapping portions) of the data packet 62. In some embodiments, data packet 62 can be associated with a flow of data packets (not shown). Although not shown, in some embodiments, key vector $KV_A$ and/or key vector $KV_B$ can be defined based a portion of the flow of data packets.

As shown in FIG. 7, a combined policy vector 64 can be defined at a combination module 780 based on a combination of at least a portion of the decompressed policy vector $DPV_A$ and at least a portion of the decompressed policy vector $DPV_B$. In some embodiments, the combination module 780 can be considered part of the processing pipeline. In some embodiments, at least a portion of the decompressed policy vector $DPV_A$ and at least a portion of the decompressed policy vector $DPV_B$ can be combined using a bitwise operation. For example, the decompressed policy vector $DPV_A$ and the decompressed policy vector $DPV_B$ can be combined in a bitwise "and" operation to define the combined policy vector 64. In some embodiments, the decompressed policy vector $DPV_A$ and decompressed policy vector $DPV_B$ can be used within a function (e.g., an algorithm) to define the combined policy vector 64. The combined policy vector 64 can be used by the packet processing module 790 to trigger and/or perform processing associated with the data packet 62 and/or a flow of data packets associated with data packet 62.

In some embodiments, the decompressed policy vector $DPV_A$, the decompressed policy vector $DPV_B$, and/or the combined policy vector 64 can have different sequences of bit values. In other words, two or more of the decompressed policy vector $DPV_A$, the decompressed policy vector $DPV_B$, and the combined policy vector 64 can have different set bit values that can each be associated with different instructions. In some embodiments, two or more of the decompressed policy vector $DPV_A$, the decompressed policy vector $DPV_B$, and the combined policy vector 64 can have similar or identical sequences of bit values. In some embodiments, two or more of the decompressed policy vector $DPV_A$, the decompressed policy vector $DPV_B$, and the combined policy vector 64 can have different bitwise lengths.

In some embodiments, portion 61 of the data packet 62 and portion 63 of the data packet 62 can be processed through the pipeline serially. For example, portion 61 of the data packet 62 can be processed through the processing pipeline before portion 63 of the data packet 62 is processed through the processing pipeline, and vice versa. In some embodiments, portion 61 of data packet 62 and portion 63 of the data packet 62 can be processed serially through one or more of the modules of the packet classification module 730. For example, portion 61 of data packet 62 can be processed at the key vector module 740 directly after portion 63 of the data packet 62 has finished processed at the key vector module 740.

In some embodiments, portion 61 of the data packet 62 and portion 63 of the data packet 62 can be processed through the processing pipeline in parallel. For example, portion 61 of the data packet 62 and portion 63 of the data packet 62 can be processed via different parallel portions (e.g., different hardware portions, or mutually exclusive hardware portions) of the modules included in the packet classification module 730. More details related to parallel processing at a packet classification module are described in connection with FIG. 9.

Figure 8:
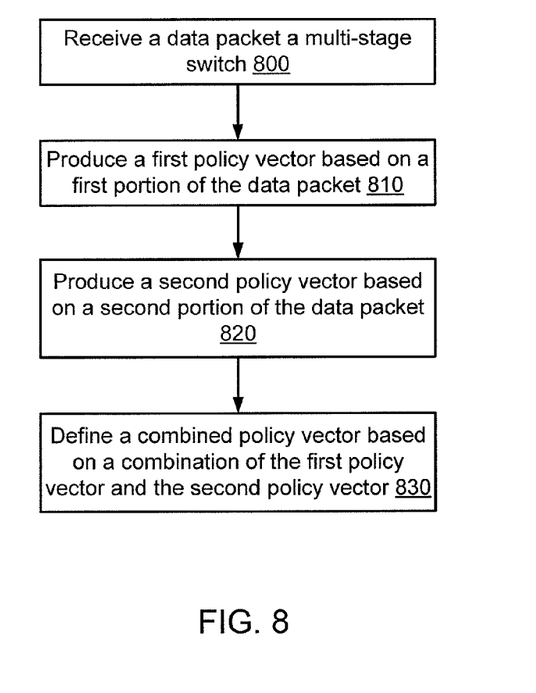
FIG. 8 is a flowchart that illustrates a method for defining a combined policy vector, according to an embodiment.

FIG. 8 is a flowchart that illustrates a method for defining a combined policy vector, according to an embodiment. As shown in FIG. 8, a data packet is received at a multi-stage switch at 800. The data packet can be received from a source network entity. In some embodiments, the data packet can be associated with a flow of data packets received at the multi-stage switch.

A first policy vector is produced (e.g., defined) based on a first portion of the data packet at 810. The first policy vector can be produced based on processing of the first portion of the data packet via a processing pipeline of a classification module. The processing pipeline can include a key vector module, a policy vector module (and/or policy vector database), a decompression module, and/or a combination module.

A second policy vector is produced (e.g., defined) based on a second portion of the data packet at 820. The second policy vector can be produced based on processing of the second portion of the data packet via the processing pipeline of the classification module. In some embodiments, the first portion of the data packet and the second portion of the data packet can be processed via portions of the processing pipeline serially or in parallel. In some embodiments, the first portion of the data packet and the second portion of the data packet can be processed via some portions of the processing pipeline serially and via other portions of the processing pipeline in parallel. The second portion of the data packet can be different than the first portion of the data packet. In some embodiments, the second policy vector can be different than or the same as the first policy vector.

A combined policy vector is defined based on a combination of the first policy vector and the second policy vector at 830. In some embodiments, the first policy vector and/or the second policy vector can be decompressed policy vectors. In some embodiments, the combined policy vector can be defined based on a bitwise combination of at least a portion of the first policy vector and at least a portion of the second policy vector. In some embodiments, at least a portion of the first policy vector and at least a portion of the second policy vector can be combined based on a function (e.g., an algorithm). In some embodiments, the combined policy vector can be defined based on a concatenation of at least a portion of the first policy vector and at least a portion of the second policy vector.

Figure 9:
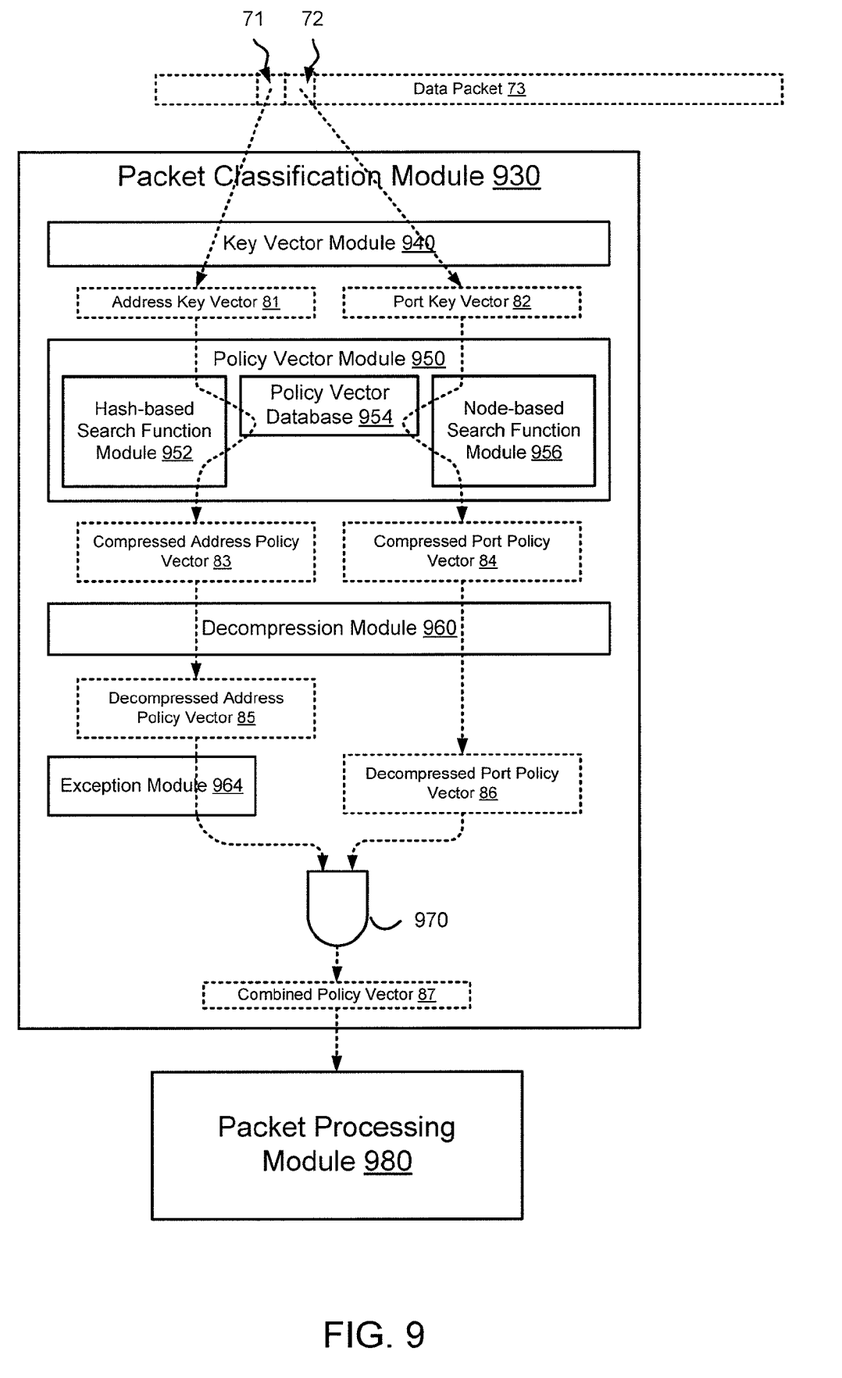
FIG. 9 is a schematic block diagram that illustrates a packet classification module configured to process a data packet, according to an embodiment.

FIG. 9 is a schematic block diagram that illustrates a packet classification module 930 configured to process a data packet 73, according to another embodiment. Specifically, the packet classification module 930 is configured to process a portion 71 of the data packet 73 associated with an address value, and a portion 72 of the data packet 73 associated with a port value. In some embodiments, the address value can be, for example, an IP address value. In some embodiments, the port value can represent an input/output (I/O) port associated a network entity. Data, such as the data packet 73, are shown as dotted boxes, and processing paths are shown as dotted lines.

As shown in FIG. 9, portion 71 of data packet 73 and portion 72 of data packet 73 are processed in parallel via the packet classification module 930. Address key vector 81 and port key vector 82 are defined at the key vector module 940 based on portion 71 of data packet 73 and portion 72 of data packet 73, respectively. In some embodiments, the address key vector 81 and the port key vector 82 can be defined via mutually exclusive hardware portions of the key vector module 940.

The address key vector 81 can be processed via a hash-based search function module 952 of a policy vector module 950 so that a compressed address policy vector 83 can be selected and retrieved from the policy vector database 954. One or more policy conditions associated with a policy (or policies) can be integrated into (e.g., encoded within) and applied by the hash-based search function module 952. The port policy vector 82 can be processed at a node-based search function module 956 so that a compressed port policy vector 84 can be selected and retrieved from the policy vector database 954. One or more policy conditions associated with a policy (or policies) can be integrated into (e.g., encoded within) and applied by the node-based search function module 956.

Although the policy vector database 954 is shown as a single database, in some embodiments, the policy vector database 954 can be stored in more than one separate database. For example, the node-based search function module 956 can be configured to access (e.g., use) a first policy vector database (not shown) and the hash-based search function module 952 can be configured to access (e.g., use) a second policy vector database (not shown) separate from the first policy vector database. In some embodiments, the policy vector database 954 can be stored in a memory (not shown). In some embodiments, the memory can be integrated into a semiconductor chip as part of the packet classification module 930 or can be an external memory. In some embodiments, the policy vector database 954 can be implemented in hardware within the packet classification module 930.

The compressed address policy vector 83 and the compressed port policy vector 84 are both decompressed at the decompression module 960. In some embodiments, the compressed address policy vector 83 and the compressed port policy vector 84 can be processed via mutually exclusive hardware portions of the decompression module 960.

As shown in FIG. 9, the compressed policy vector 83 can be processed at an exception module 964. The exception module 964 can be configured to handle an exception to a policy condition related to portion 71 of the data packet 73 and can be configured to modify the decompressed address policy vector 85 accordingly. In some embodiments, an exception to a policy condition can be associated with an instruction and can be defined within a policy. For example, a first instruction can be executed when a policy condition is satisfied and a different instruction can be executed when the policy condition is satisfied but an exception to the policy condition is also satisfied. Although not shown, in some embodiments, the decompressed port policy vector 86 can also be modified at the exception module 964 (or a mutually exclusive portion of the exception module (not shown)) based on an exception to a policy condition related to portion 72 of the data packet 73. More details related to a handling of an exception to a policy condition are set forth in co-pending U.S. patent application Ser. No. 12/242,278, filed Sep. 30, 2008, entitled, "Methods and Apparatus to Implement Except Condition During Data Packet Classification," which is incorporated herein by reference in its entirety.

The combined policy vector 87 is defined at the combination module 970 based on a bitwise "and" combination of the decompressed address policy vector 85 and the decompressed port policy vector 86. Although not shown, in some embodiments, the combined policy vector 87 can be defined based on a different logical operation such as an exclusive-or operation or a complex logical operation that includes multiple gate types (e.g., an "or" gate) and/or an algorithm.

As shown in FIG. 9, the combined policy vector 87 can be sent to a packet processing module 980. The packet processing module 790 can be configured to trigger and/or perform processing associated with the data packet 73 and/or a flow of data packets associated with data packet 73 based on the combined policy vector 87. Specifically, the packet processing module 790 can be configured to trigger and/or perform specified instructions associated with bit values that are set within the combined policy vector 87.

In some embodiments, each of the components (e.g., modules) within the packet classification module 930 can be implemented in hardware within one or more semiconductor chips. In some embodiments, the packet processing module 980 can be integrated with the packet classification module 930 on a single integrated chip.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments, a policy vector database can be configured to store decompressed policy vectors. In such cases, a decompression module would not need to be included as a component in a packet classification module. In some embodiments, for example, one or more combined policy vectors can be defined based on N compressed (and/or decompressed) policy vectors.

What is claimed is:

1. A method, comprising:
    producing a first policy vector based on a first portion of a data packet received at a multi-stage switch;
    producing a second policy vector based on a second portion of the data packet different than the first portion of the data packet; and
    producing a third policy vector based on a combination of at least the first policy vector and at least the second policy vector, the third policy vector including a combination of bit values configured to trigger an element at the multi-stage switch to process the data packet,
    each of the first policy vector and the second policy vector is a decompressed policy vector defined based on a compressed policy vector retrieved from a policy vector database.

2. The method of claim 1, wherein the combination is a logical combination of a plurality of bit values included in the first policy vector and of a plurality of bit values included in the second policy vector.

3. The method of claim 1, wherein the first policy vector and the second policy vector are different.

4. The method of claim 1, wherein the first portion of the data packet is associated with an address value, and the second portion of the data packet is associated with a port value.

5. The method of claim 1, wherein the first portion of the data packet is associated with a source address value, and the second portion of the data packet is associated with a destination address value.

6. The method of claim 1, wherein the first portion of the data packet is associated with a source port value, and the second portion of the data packet is associated with a destination port value.

7. The method of claim 1, wherein each bit value from the combination of bit values included in the third policy vector is associated with a condition-action combination defined within a policy.

8. The method of claim 1, wherein the producing associated with the first policy vector includes producing via a hash-based search function, the producing associated with the second policy vector includes producing via a node-based search function.

9. The method of claim 1, wherein the producing associated with the first policy vector, the producing associated with the second policy vector, and the producing associated with the third policy vector are performed based on a set of functions implemented in hardware.

10. An apparatus implemented in at least one of a memory or a processing device, comprising:
    a hash-based search function module configured to produce a first policy vector based on a first portion of a data packet received at a multi-stage switch, the multi-stage switch being a Clos switch fabric;
    a node-based search function module configured to produce a second policy vector based on a second portion of a data packet different than the first portion of the data packet; and
    a combination module configured to produce a third policy vector based on at least the first policy vector and at least the second policy vector, the third policy vector including a combination of bit values configured to trigger an element to route the data packet through the Clos switch fabric.

11. The apparatus of claim 10, further comprising:
    a memory configured to store a policy vector database, the hash-based search function module is configured to retrieve the first policy vector from the policy vector database,
    the memory, the hash-based search function module, and the node-based search function module are integrated on a single semiconductor chip.

12. An apparatus implemented in at least one of a memory or a processing device, comprising:
    a key vector module configured to define a first key vector and a second key vector based on a data packet received at a multi-stage switch;
    a first hardware processing path configured to receive the first key vector and configured to define a first policy vector based on the first key vector, the first policy vector being encoded with a first data-packet-processing instruction, the first hardware processing path including a hash-based search function module; and a second hardware processing path configured to receive the second key vector and configured to define a second policy vector based on the second key vector, the second policy vector being encoded with a second data-packet-processing instruction, the second hardware processing path being different than the first hardware processing path, the second hardware processing path including a node-based search function module, the first hardware processing path and the second hardware processing path being configured to operate in parallel.

13. The apparatus of claim 12, further comprising:

a combination module configured to receive the first policy vector and the second policy vector, the combination module configured to produce a third policy vector encoded with a third data-packet-processing instruction based on a combination of the first data-packet-processing instruction associated with the first policy vector and the second data-packet-processing instruction associated with the second policy vector.

14. The apparatus of claim 12, wherein the first hardware processing path and the second hardware processing path are integrated on a single chip.

15. The apparatus of claim 12, wherein the key vector module is configured to define the first key vector based on at least a portion of an address value from the data packet, the key vector module is configured to define the second key vector based on at least a portion of a port value from the data packet.

16. The apparatus of claim 12, wherein the first hardware processing path includes a policy vector module configured to retrieve a compressed policy vector based on the first key vector, the first hardware processing path includes a decompression module configured to produce the first policy vector based on decompression of the compressed policy vector.

* * * * *